United States Patent
Huke et al.

(10) Patent No.: US 11,217,067 B1
(45) Date of Patent: Jan. 4, 2022

(54) WAGER ODDS BALANCING METHOD

(71) Applicant: AdrenalineIP, Washington, DC (US)

(72) Inventors: Casey Alexander Huke, Washington, DC (US); John Cronin, Jericho, VT (US); Joseph W. Beyers, Saratoga, CA (US); Michael D'Andrea, Burlington, VT (US); Harrison Grant, Anaheim, CA (US); Michael Baker, Georgie, VT (US)

(73) Assignee: AdrenalineIP, Washington, DC (US)

(*) Notice: Subject to any disclaimer, the term of this patent is extended or adjusted under 35 U.S.C. 154(b) by 0 days.

(21) Appl. No.: 17/096,187

(22) Filed: Nov. 12, 2020

Related U.S. Application Data (60) Provisional application No. 63/093,430, filed on Oct. 19, 2020.

(51) Int. Cl.
*G07F 17/32* (2006.01)

(52) U.S. Cl.
CPC ...... *G07F 17/3288* (2013.01); *G07F 17/3223* (2013.01); *G07F 17/3276* (2013.01)

(58) Field of Classification Search
None
See application file for complete search history.

(56) References Cited

U.S. PATENT DOCUMENTS

| | | | |
|---|---|---|---|
| 8,808,085 B2 | 8/2014 | Schugar | |
| 9,076,305 B2 | 7/2015 | Amaitis et al. | |
| 10,565,828 B2 | 2/2020 | Amaitis et al. | |
| 2001/0051540 A1* | 12/2001 | Hindman | G07F 17/3288 463/25 |
| 2003/0087701 A1* | 5/2003 | Paravia | G07F 17/32 463/42 |
| 2012/0264503 A1* | 10/2012 | Lisenbee | G07F 17/326 463/25 |
| 2020/0111325 A1 | 4/2020 | Lockton et al. | |

OTHER PUBLICATIONS

Notification of Transmittal of the International Search Report and the Written Opinion of the International Searching Authority dated Nov. 12, 2021, in connection with corresponding international Application No. PCT/US2021/055552 (6pp.).

* cited by examiner

*Primary Examiner* — Jay Trent Liddle
*Assistant Examiner* — Alex P. Rada, II
(74) *Attorney, Agent, or Firm* — Maier & Maier, PLLC (57) ABSTRACT

A method of reducing the exposure of a wagering network when the exposure exceeds a threshold due to an imbalance of wagers placed on one outcome compared to other outcomes by offering updated odds to users having placed wagers on less favored outcomes and further offering to update the odds of their original wager if they increase their wager amount to incentivize the users to increase their wager, thus reducing the exposure of the wagering network.

10 Claims, 4 Drawing Sheets

Fig. 1

| User ID | Play Number | Outcome | Wager Amount | Odds |
|---|---|---|---|---|
| 03151 | 014 | Second down | $1,000.00 | 2/1 |
| 05468 | 014 | First down | $125.00 | 4/1 |
| 65465 | 014 | Second down | $300.00 | 2/1 |
| 31235 | 014 | Second down | $375.00 | 2/1 |
| 64698 | 014 | Second down | $600.00 | 2/1 |
| 32168 | 014 | Second down | $572.00 | 2/1 |
| 13595 | 014 | First down | $50.00 | 4/1 |
| 31268 | 014 | Second down | $1,000.00 | 2/1 |
| 68735 | 014 | Second down | $1,150.00 | 2/1 |
| 23348 | 014 | First down | $75.00 | 4/1 |

WAGER ODDS BALANCING METHOD

FIELD

The embodiments are generally related to wagering on live sporting events such as, play by play wagering and the mitigation of exposure.

BACKGROUND

Wagers placed on a live sporting event with two outcomes will yield wagers on each side of the outcome. While the odds are typically set to weigh the less favorable outcome with a greater potential payout to balance the risk to the bookmaker, bettors may still prefer to place their wagers on the more favorable outcome in numbers great enough to expose the bookmaker to unacceptable risk.

The risk exposure of a bookmaker is typically reduced by an increase in the number of wagers, however an imbalance in the distribution of wagers can also create risk regardless of the number of wagers placed. If too many wagers are placed on an outcome with more favorable odds, it becomes necessary to incentivize wagers on the less favorable outcome, usually by adjusting the odds such that a greater potential payout would encourage bettors to place wagers.

A bookmaker may change the odds of a less favorable outcome to incentivize bettors to place wagers on the less favorable outcome, these odds largely appeal to and benefit bettors who have not already placed a wager. This method relies largely upon new bettors placing wagers on the less favorable outcome in response to the greater potential payout. Current methods do not offer a means of appealing to bettors who have already placed a wager as they are already engaged and actively placing wagers.

SUMMARY

A method, system, and apparatus for balancing wagering odds. In one embodiment, a method of reducing exposure of a wagering network by incentivizing targeted users can include receiving data from a live sporting event upon which wagers can be placed on single plays inside of the live event, measuring a balance of wagers on each potential outcome of the single plays, identifying instances in which the balance of wagers raises exposure of the wagering network above a threshold, and identifying users who have selected a wager opposite the exposure, and offering one or more incentives to the identified users to increase a wager amount.

In another exemplary embodiment, a method for providing updated wagering options on a wagering network for single play wagering can include, executing on a processor the steps of, displaying a wagering platform; displaying one or more wagers for wagering on a single play of a live sporting event; displaying a selected wager; and displaying improved odds after the wager is selected.

BRIEF DESCRIPTIONS OF THE DRAWINGS

The accompanying drawings illustrate various embodiments of systems, methods, and various other aspects of the embodiments. Any person with ordinary skills in the art will appreciate that the illustrated element boundaries (e.g. boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Aspects of the present invention are disclosed in the following description and related figures directed to specific embodiments of the invention. Those of ordinary skill in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word exemplary means serving as an example, instance or illustration. The embodiments described herein are not limiting, but rather are exemplary only. It should be understood that the described embodiments are not necessarily to be construed as preferred or advantageous over other embodiments. Moreover, the terms embodiments of the invention, embodiments or invention do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, a computer configured to perform the described action.

With respect to the embodiments, a summary of terminology used herein is provided.

An action refers to a specific play or specific movement in a sporting event. For example, an action may determine which players were involved during a sporting event. In some embodiments, an action may be a throw, shot, pass, swing, kick, hit, performed by a participant in a sporting event. In some embodiments, an action may be a strategic decision made by a participant in the sporting event such as a player, coach, management, etc. In some embodiments, an action may be a penalty, foul, or type of infraction occurring in a sporting event. In some embodiments, an action may include the participants of the sporting event. In some embodiments, an action may include beginning events of sporting event, for example opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

A "bet" or "wager" is to risk something, usually a sum of money, against someone else's or an entity on the basis of the outcome of a future event, such as the results of a game or event. It may be understood that non-monetary items may be the subject of a "bet" or "wager" as well, such as points or anything else that can be quantified for a "bet" or "wager". A bettor refers to a person who bets or wagers. A bettor may also be referred to as a user, client, or participant throughout the present invention. A "bet" or "wager" could be made for obtaining or risking a coupon or some enhancements to the sporting event, such as better seats, VIP treatment, etc. A "bet" or "wager" can be done for certain amount or for a future time. A "bet" or "wager" can be done for being able to answer a question correctly. A "bet" or "wager" can be done within a certain period of time. A "bet" or "wager" can be integrated into the embodiments in a variety of manners.

A "book" or "sportsbook" refers to a physical establishment that accepts bets on the outcome of sporting events. A "book" or "sportsbook" system enables a human working with a computer to interact, according to set of both implicit and explicit rules, in an electronically powered domain for the purpose of placing bets on the outcome of sporting event. An added game refers to an event not part of the typical menu of wagering offerings, often posted as an accommodation to patrons. A "book" or "sportsbook" can be integrated into the embodiments in a variety of manners.

To "buy points" means a player pays an additional price (more money) to receive a half-point or more in the player's favor on a point spread game. Buying points means you can move a point spread, for example up to two points in your favor. "Buy points" can be integrated into the embodiments in a variety of manners.

The "price" refers to the odds or point spread of an event. To "take the price" means betting the underdog and receiving its advantage in the point spread. "Price" can be integrated into the embodiments in a variety of manners.

"No action" means a wager in which no money is lost or won, and the original bet amount is refunded. "No action" can be integrated into the embodiments in a variety of manners.

The "sides" are the two teams or individuals participating in an event: the underdog and the favorite. The term "favorite" refers to the team considered most likely to win an event or game. The "chalk" refers to a favorite, usually a heavy favorite. Bettors who like to bet big favorites are referred to "chalk eaters" (often a derogatory term). An event or game in which the sports book has reduced its betting limits, usually because of weather or the uncertain status of injured players is referred to as a "circled game." "Laying the points or price" means betting the favorite by giving up points. The term "dog" or "underdog" refers to the team perceived to be most likely to lose an event or game. A "longshot" also refers to a team perceived to be unlikely to win an event or game. "Sides", "favorite", "chalk", "circled game", "laying the points price", "dog" and "underdog" can be integrated into the embodiments in a variety of manners.

The "money line" refers to the odds expressed in terms of money. With money odds, whenever there is a minus (–) the player "lays" or is "laying" that amount to win (for example $100); where there is a plus (+) the player wins that amount for every $100 wagered. A "straight bet" refers to an individual wager on a game or event that will be determined by a point spread or money line. The term "straight-up" means winning the game without any regard to the "point spread"; a "money-line" bet. "Money line", "straight bet", "straight-up" can be integrated into the embodiments in a variety of manners.

The "line" refers to the current odds or point spread on a particular event or game. The "point spread" refers to the margin of points in which the favored team must win an event by to "cover the spread." To "cover" means winning by more than the "point spread". A handicap of the "point spread" value is given to the favorite team so bettors can choose sides at equal odds. "Cover the spread" means that a favorite win an event with the handicap considered or the underdog wins with additional points. To "push" refers to when the event or game ends with no winner or loser for wagering purposes, a tie for wagering purposes. A "tie" is a wager in which no money is lost or won because the teams' scores were equal to the number of points in the given "point spread". The "opening line" means the earliest line posted for a particular sporting event or game. The term "pick" or "pick 'em" refers to a game when neither team is favored in an event or game. "Line", "cover the spread", "cover", "tie", "pick" and "pick-em" can be integrated into the embodiments in a variety of manners.

To "middle" means to win both sides of a game; wagering on the "underdog" at one point spread and the favorite at a different point spread and winning both sides. For example, if the player bets the underdog +4½ and the favorite –3½ and the favorite wins by 4, the player has middled the book and won both bets. "Middle" can be integrated into the embodiments in a variety of manners.

Digital gaming refers to any type of electronic environment that can be controlled or manipulated by a human user for entertainment purposes. A system that enables a human and a computer to interact according to set of both implicit and explicit rules, in an electronically powered domain for the purpose of recreation or instruction. "eSports" refers to a form of sports competition using video games, or a multiplayer video game played competitively for spectators, typically by professional gamers. Digital gaming and "eSports" can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. Event can be integrated into the embodiments in a variety of manners.

The "total" is the combined number of runs, points or goals scored by both teams during the game, including overtime. The "over" refers to a sports bet in which the player wagers that the combined point total of two teams will be more than a specified total. The "under" refers to bets that the total points scored by two teams will be less than a certain figure. "Total", "over", and "under" can be integrated into the embodiments in a variety of manners.

A "parlay" is a single bet that links together two or more wagers; to win the bet, the player must win all the wagers in the "parlay". If the player loses one wager, the player loses the entire bet. However, if he wins all the wagers in the "parlay", the player wins a higher payoff than if the player had placed the bets separately. A "round robin" is a series of parlays. A "teaser" is a type of parlay in which the point spread, or total of each individual play is adjusted. The price of moving the point spread (teasing) is lower payoff odds on winning wagers. "Parlay", "round robin", "teaser" can be integrated into the embodiments in a variety of manners.

A "prop bet" or "proposition bet" means a bet that focuses on the outcome of events within a given game. Props are often offered on marquee games of great interest. These include Sunday and Monday night pro football games, various high-profile college football games, major college bowl games and playoff and championship games. An example of a prop bet is "Which team will score the first touchdown?" "Prop bet" or "proposition bet" can be integrated into the embodiments in a variety of manners.

A "first-half bet" refers to a bet placed on the score in the first half of the event only and only considers the first half of the game or event. The process in which you go about placing this bet is the same process that you would use to place a full game bet, but as previously mentioned, only the first half is important to a first-half bet type of wager. A "half-time bet" refers to a bet placed on scoring in the second half of a game or event only. "First-half-bet" and "half-time-bet" can be integrated into the embodiments in a variety of manners.

A "futures bet" or "future" refers to the odds that are posted well in advance on the winner of major events, typical future bets are the Pro Football Championship, Collegiate Football Championship, the Pro Basketball Championship, the Collegiate Basketball Championship, and the Pro Baseball Championship. "Futures bet" or "future" can be integrated into the embodiments in a variety of manners.

The "listed pitchers" is specific to a baseball bet placed only if both of the pitchers scheduled to start a game actually start. If they don't, the bet is deemed "no action" and refunded. The "run line" in baseball, refers to a spread used instead of the money line. "Listed pitchers" and "no action" and "run line" can be integrated into the embodiments in a variety of manners.

The term "handle" refers to the total amount of bets taken. The term "hold" refers to the percentage the house wins. The term "juice" refers to the bookmaker's commission, most commonly the 11 to 10 bettors lay on straight point spread wagers: also known as "vigorish" or "vig". The "limit" refers to the maximum amount accepted by the house before the odds and/or point spread are changed. "Off the board" refers to a game in which no bets are being accepted. "Handle", "juice", vigorish", "vig" and "off the board" can be integrated into the embodiments in a variety of manners.

"Casinos" are a public room or building where gambling games are played. "Racino" is a building complex or grounds having a racetrack and gambling facilities for playing slot machines, blackjack, roulette, etc. "Casino" and "Racino" can be integrated into the embodiments in a variety of manners.

Customers are companies, organizations or individual that would deploy, for fees, and may be part of, or perform, various system elements or method steps in the embodiments.

Managed service user interface service is a service that can help customers (1) manage third parties, (2) develop the web, (3) do data analytics, (4) connect thru application program interfaces and (4) track and report on player behaviors. A managed service user interface can be integrated into the embodiments in a variety of manners.

Managed service risk management services is a service that assists customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling and (4) customer service assistance. These managed service compliance services can be integrated into the embodiments in a variety of manners.

Managed service pricing and trading service is a service that helps customers with (1) official data feeds, (2) data visualization and (3) land based, on property digital signage. These managed service pricing and trading services can be integrated into the embodiments in a variety of manners.

Managed service and technology platform are services that helps customers with (1) web hosting, (2) IT support and (3) player account platform support. These managed service and technology platform services can be integrated into the embodiments in a variety of manners.

Managed service and marketing support services are services that help customers (1) acquire and retain clients and users, (2) provide for bonusing options and (3) develop press release content generation. These managed service and marketing support services can be integrated into the embodiments in a variety of manners.

Payment processing services are those services that help customers that allow for (1) account auditing and (2) withdrawal processing to meet standards for speed and accuracy. Further, these services can provide for integration of global and local payment methods. These payment processing services can be integrated into the embodiments in a variety of manners.

Engaging promotions allow customers to treat your players to free bets, odds boosts, enhanced access and flexible cashback to boost lifetime value. Engaging promotions can be integrated into the embodiments in a variety of manners.

"Cash out" or "pay out" or "payout" allow customers to make available, on singles bets or accumulated bets with a partial cash out where each operator can control payouts by managing commission and availability at all times. The "cash out" or "pay out" or "payout" can be integrated into the embodiments in a variety of manners, including both monetary and non-monetary payouts, such as points, prizes, promotional or discount codes, and the like.

"Customized betting" allow customers to have tailored personalized betting experiences with sophisticated tracking and analysis of players' behavior. "Customized betting" can be integrated into the embodiments in a variety of manners.

Kiosks are devices that offer interactions with customers clients and users with a wide range of modular solutions for both retail and online sports gaming. Kiosks can be integrated into the embodiments in a variety of manners.

Business Applications are an integrated suite of tools for customers to manage the everyday activities that drive sales, profit, and growth, by creating and delivering actionable insights on performance to help customers to manage the sports gaming. Business Applications can be integrated into the embodiments in a variety of manners.

State based integration allows for a given sports gambling game to be modified by states in the United States or other countries, based upon the state the player is in, based upon mobile phone or other geolocation identification means. State based integration can be integrated into the embodiments in a variety of manners.

Game Configurator allow for configuration of customer operators to have the opportunity to apply various chosen or newly created business rules on the game as well as to parametrize risk management. Game configurator can be integrated into the embodiments in a variety of manners.

"Fantasy sports connector" are software connectors between method steps or system elements in the embodiments that can integrate fantasy sports. Fantasy sports allow a competition in which participants select imaginary teams from among the players in a league and score points according to the actual performance of their players. For example, if a player in a fantasy sports is playing at a given real time sports, odds could be changed in the real time sports for that player.

Software as a service (or SaaS) is a method of software delivery and licensing in which software is accessed online via a subscription, rather than bought and installed on individual computers. Software as a service can be integrated into the embodiments in a variety of manners.

Synchronization of screens means synchronizing bets and results between devices, such as TV and mobile, PC and wearables. Synchronization of screens can be integrated into the embodiments in a variety of manners.

Automatic content recognition (ACR) is an identification technology to recognize content played on a media device or present in a media file. Devices containing ACR support enable users to quickly obtain additional information about the content they see without any user-based input or search efforts. To start the recognition, a short media clip (audio, video, or both) is selected. This clip could be selected from within a media file or recorded by a device. Through algorithms such as fingerprinting, information from the actual perceptual content is taken and compared to a database of reference fingerprints, each reference fingerprint corresponding to a known recorded work. A database may contain metadata about the work and associated information, including complementary media. If the fingerprint of the media clip is matched, the identification software returns the corresponding metadata to the client application. For example, during an in-play sports game a "fumble" could be recognized and at the time stamp of the event, metadata such as "fumble" could be displayed. Automatic content recognition (ACR) can be integrated into the embodiments in a variety of manners.

Joining social media means connecting an in-play sports game bet or result to a social media connection, such as a FACEBOOK® chat interaction. Joining social media can be integrated into the embodiments in a variety of manners.

Augmented reality means a technology that superimposes a computer-generated image on a user's view of the real world, thus providing a composite view. In an example of this invention, a real time view of the game can be seen and a "bet" which is a computer-generated data point is placed above the player that is bet on. Augmented reality can be integrated into the embodiments in a variety of manners.

Some embodiments of this disclosure, illustrating all its features, will now be discussed in detail. It can be understood that the embodiments are intended to be open ended in that an item or items used in the embodiments is not meant to be an exhaustive listing of such item or items, or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used in the practice or testing of embodiments, only some exemplary systems and methods are now described.

Figure 1:
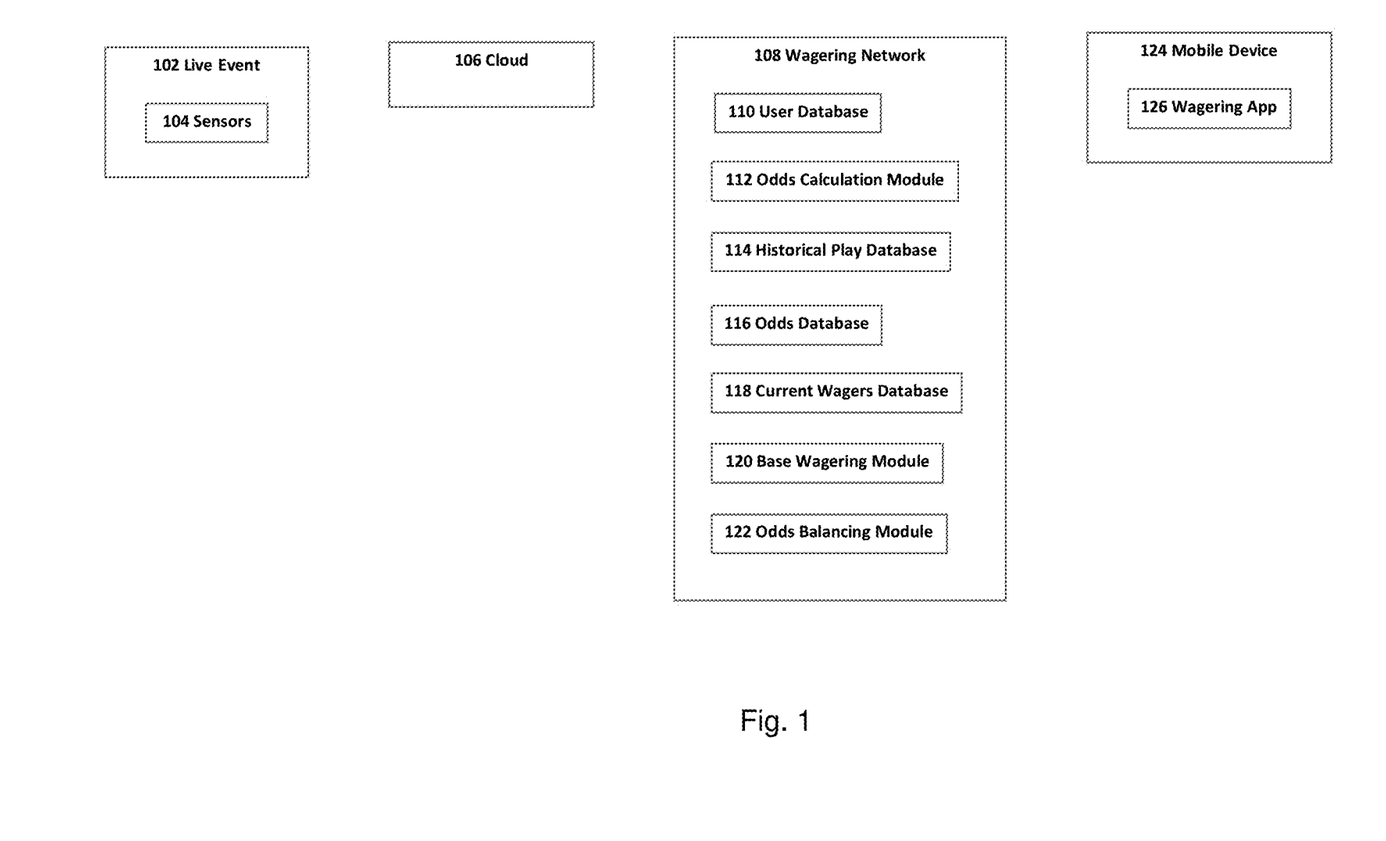
FIG. 1 illustrates a wager odds balancing method, according to an embodiment.

FIG. 1 is a system for a wager odds balancing method. This system comprises of a live event 102, for example a sporting event such as a football game, basketball game, baseball game, hockey game, tennis match, golf tournament, eSports or digital game, etc. The live event will include some number of actions or plays, upon which a user, bettor or customer can place a bet or wager, typically through an entity called a sportsbook. There are numerous types of wagers the bettor can make, including, a straight bet, a money line bet, a bet with a point spread or line that bettor's team would need to cover, if the result of the game was the same as the point spread the user would not cover the spread, but instead the tie is called a push. If the user is betting on the favorite, they are giving points to the opposing side, which is the underdog or longshot. Betting on all favorites is referred to as a chalk, this is typically applied to round robin, or other styles of tournaments. There are other types of wagers, including parlays, teasers, and prop bets, that are added games, that often allow the user to customize their betting, by changing the odds and payouts they receive on a wager. Certain sportsbooks will allow the bettor to buy points, to move the point spread off of the opening line, this will increase the price of the bet, sometimes by increasing the juice, vig, or hold that the sportsbook takes. Another type of wager the bettor can make is an over/under, in which the user bets over or under a total for the live event, such as the score of American football or the run line in baseball, or a series of action in the live event. Sportsbooks have a number of bets they can handle, a limit of wagers they can take on either side of a bet before they will move the line or odds off of the opening line. Additionally, there are circumstances, such as an injury to an important player such as a listed pitcher, in which a sportsbook, casino or racino will take an available wager off the board. As the line moves there becomes an opportunity for a bettor to bet on both sides at different point spreads in order to middle and win both bets. Sportsbooks will often offer bets on portions of games, such as first half bets and half-time bets. Additionally, the sportsbook can offer futures bets on live events in the future. Sportsbooks need to offer payment processing services in order to cash out customers. This can be done at kiosks at the live event or at another location.

Further, embodiments may include a plurality of sensors 104 that may be used such as motion sensors, temperature sensors, humidity sensors, cameras such as an RGB-D Camera which is a digital camera capturing color (RGB) and depth information for every pixel in an image, microphones, a radiofrequency receiver, a thermal imager, a radar device, a lidar device, an ultrasound device, a speaker, wearable devices etc. Also, the plurality of sensors 104 may include tracking devices, such as RFID tags, GPS chips or other such devices embedded on uniforms, in equipment, in the field of play, in the boundaries of the field of play, or other markers on the field of play. Imaging devices may also be used as tracking devices such as player tracking that captures statistical information through real-time X, Y positioning of players and X, Y, Z positioning of the ball.

Further, embodiments may include a cloud 106 or communication network which may be a wired and/or a wireless network. The communication network, if wireless, may be implemented using communication techniques such as Visible Light Communication (VLC), Worldwide Interoperability for Microwave Access (WiMAX), Long Term Evolution (LTE), Wireless Local Area Network (WLAN), Infrared (IR)

communication, Public Switched Telephone Network (PSTN), Radio waves, and other communication techniques known in the art. The communication network may allow ubiquitous access to shared pools of configurable system resources and higher-level services that can be rapidly provisioned with minimal management effort, for example over Internet, and relies on sharing of resources to achieve coherence and economies of scale, like a public utility, while third-party clouds enable organizations to focus on their core businesses instead of expending resources on computer infrastructure and maintenance. The cloud 106 may be communicatively coupled to a wagering network 108 which may perform real time analysis on the type of play and the result of the play. The cloud 106 may also be synchronized with game situational data, such as the time of the game, the score, location on the field, weather conditions, and the like which may affect the choice of play utilized. For example, in some exemplary embodiments, the cloud 106 may not receive data gathered from sensors and may, instead, receive data from an alternative data feed, such as SportsRadar®. This data may be provided substantially immediately following the completion of any play and the data from this feed may be compared with a variety of team data and league data based on a variety of elements, including down, possession, score, time, team, and so forth, as described in various exemplary embodiments herein.

Further, embodiments may include the wagering network 108 which may perform real time analysis on the type of play and the result of a play or action. The wagering network 108 (or cloud 106) may also be synchronized with game situational data, such as the time of the game, the score, location on the field, weather conditions, and the like which may affect the choice of play utilized. For example, in some exemplary embodiments, the wagering network 108 may not receive data gathered from sensors and may, instead, receive data from an alternative data feed, such as SportsRadar®. This data may be provided substantially immediately following the completion of any play and the data from this feed may be compared with a variety of team data and league data based on a variety of elements, including down, possession, score, time, team, and so forth, as described in various exemplary embodiments herein. The wagering network 108 can offer a number of software managed services such as, user interface service, risk management service, compliance, pricing and trading service, IT support of the technology platform, business applications, game configuration, state based integration, fantasy sports connection, integration to allow the joining of social media, as well as marketing support services that can deliver engaging promotions to the user.

Further, embodiments may utilize a user database 110 which contains data relevant to all users of the system, which may include a user ID, a device identifier, a paired device identifier, wagering history, and wallet information for each user.

Further, embodiments may include an odds calculation module 112 which utilizes historical play data to calculate odds for in-play wagers.

Further, embodiments may include a historical plays database 114, which contains play data for the type of sport being played in a Live Sporting Event 102. For example, in American Football, for optimal odds calculation, the historical play data should include meta data about the historical plays, such as time, location, weather, previous plays, opponent, physiological data, etc.

Further, embodiments may utilize an odds database 116 that contains the odds calculated by the odds calculation module 112, with multipliers for things such as distance and path deviation, and which is used for reference by the base wagering module 120 to take bets from the user through a user interface and calculate the payouts to the user.

Further, embodiments may utilize a current wagers database 118 that contains wagers during a live event 102. Wagers may include a wager amount, odds, and an outcome such that a payout, in the amount of the wager amount multiplied by the odds, will be paid to a user if the outcome wagered on occurs, otherwise the wager amount being lost.

Further, embodiments may include the base wagering module 120 which allows a user to place wagers on individual events in the live event 102. The user may make a traditional wager, such as wagering that the next play in an American football game will be a run instead of a pass. In this example the user is getting 2/1 odds on the run, meaning that for every $100 they wager, they will receive $200 if they win. The base wagering module 120 further queries the current wagers database 118 for the presence of an imbalanced wager market such that the exposure of a wagering network 108 from one outcome exceeds a threshold for an individual event or play and triggers the odds balancing module 122 when such an imbalance is detected. Upon completion of a play, the base wagering module 120 determines the result of wager and adjusts the balance of the user's account in the user database 110 based upon the result of the wager.

Further, embodiments may include the odds balancing module 122 that receives a prompt from the base wagering module 120 that an imbalanced wager market is present, such that the exposure to a wagering network 108 of one outcome exceeds a threshold. The odds balancing module 122 queries the current wagers database 118 for wagers placed on the next play at the live event 102 and determines an amount of wagers needed to correct the imbalanced wager market. Updated odds are retrieved from the odds database 116 and an offer is made to a user to increase their existing wager such that the entirety of the original wager amount and the wager increase amount would be wagered at the updated odds. the odds balancing module 122 continues to check for an imbalanced wager market and returns to the base wagering module 120 when an imbalanced wager market is no longer present.

Further, embodiments may include a mobile device 124 such as a computing device, laptop, smartphone, tablet, computer, smart speaker, or I/O devices. I/O devices may be present in the computing device. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers. Devices may include a combination of multiple input or output devices, including, e.g., Microsoft KINECT, Nintendo Wii mote for the WIT, Nintendo WII U GAMEPAD, or Apple IPHONE. Some devices allow gesture recognition inputs through combining some of the inputs and outputs. Some devices allow for facial recognition which may be utilized as an input for different purposes including authentication and other commands. Some devices provides for voice recognition and inputs, including, e.g., Microsoft KINECT, SIRI for IPHONE by Apple, Google Now or Google Voice Search.

Additional user devices have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices, display devices or group of devices may be augmented reality devices. The I/O devices may be controlled by an I/O controller. The I/O controller may control one or more I/O devices, such as, e.g., a keyboard and a pointing device, e.g., a mouse or optical pen. Furthermore, an I/O device may also contain storage and/or an installation medium for the computing device. In still other embodiments, the computing device may include USB connections (not shown) to receive handheld USB storage devices. In further embodiments, an I/O device may be a bridge between the system bus and an external communication bus, e.g. a USB bus, a SCSI bus, a FireWire bus, an Ethernet bus, a Gigabit Ethernet bus, a Fiber Channel bus, or a Thunderbolt bus. In some embodiments the mobile device 124 could be an optional component and would be utilized in a situation in which a paired wearable device is utilizing the mobile device 124 as additional memory or computing power or connection to the internet.

Further, embodiments may include a wagering app 126, which is a program that enables the user to place bets on individual plays in the live event 102, and displays the audio and video from the live event 102, along with the available wagers on the mobile device 124. The wagering app 126 allows the user to interact with the wagering network 108 in order to place bets and provide payment/receive funds based on wager outcomes.

Figure 2:
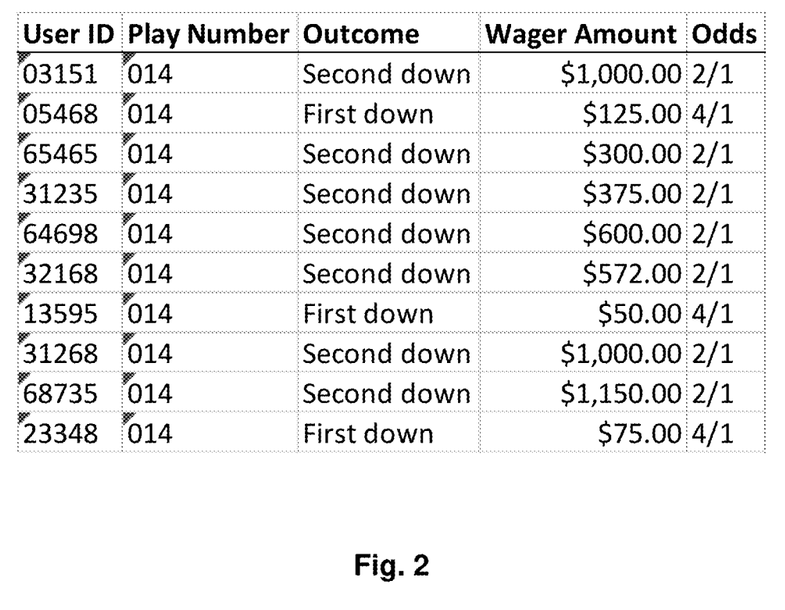
FIG. 2 illustrates a current wagers database, according to an embodiment.

FIG. 2 illustrates the current wagers database 118. The current wagers database 118 stores data about wagers placed by bettors during the live event 102 and may include any of a user ID, wager amount, odds, and outcome. The user ID identifying the user of a play by play wagering network who placed the wager, a wager amount is a monetary value wagered by the user, the odds are the multiple by which the wager amount will be increased to calculate a payout if the wager is won. A wager is won if the outcome, the result of a play, occurs. The current wagers database 118 is populated by the base wagering module 120 and is used by the base wagering module 120 and the odds balancing module 122 to determine the presence of a wagering imbalance and further used by the odds balancing module 122 to balance the total payouts of all possible outcomes. In an embodiment, wagers are placed on the next play of an American football game and the outcomes upon which wagers are placed are whether or not a first down results from the next play. The total payouts of a first down occurring is $2,000 and the total payouts of a first down not occurring is $10,000 resulting in an exposure to a wagering network 108 of $8,000 or 5/1. The base wagering module 120 determines the presence of an imbalanced wager market if the exposure to the wagering network 108 exceeds a threshold value, such as 3/1, and the odds balancing module 122 further incentivizes additional wagers on the first down outcome to balance the exposure to the wagering network 108.

Figure 3:
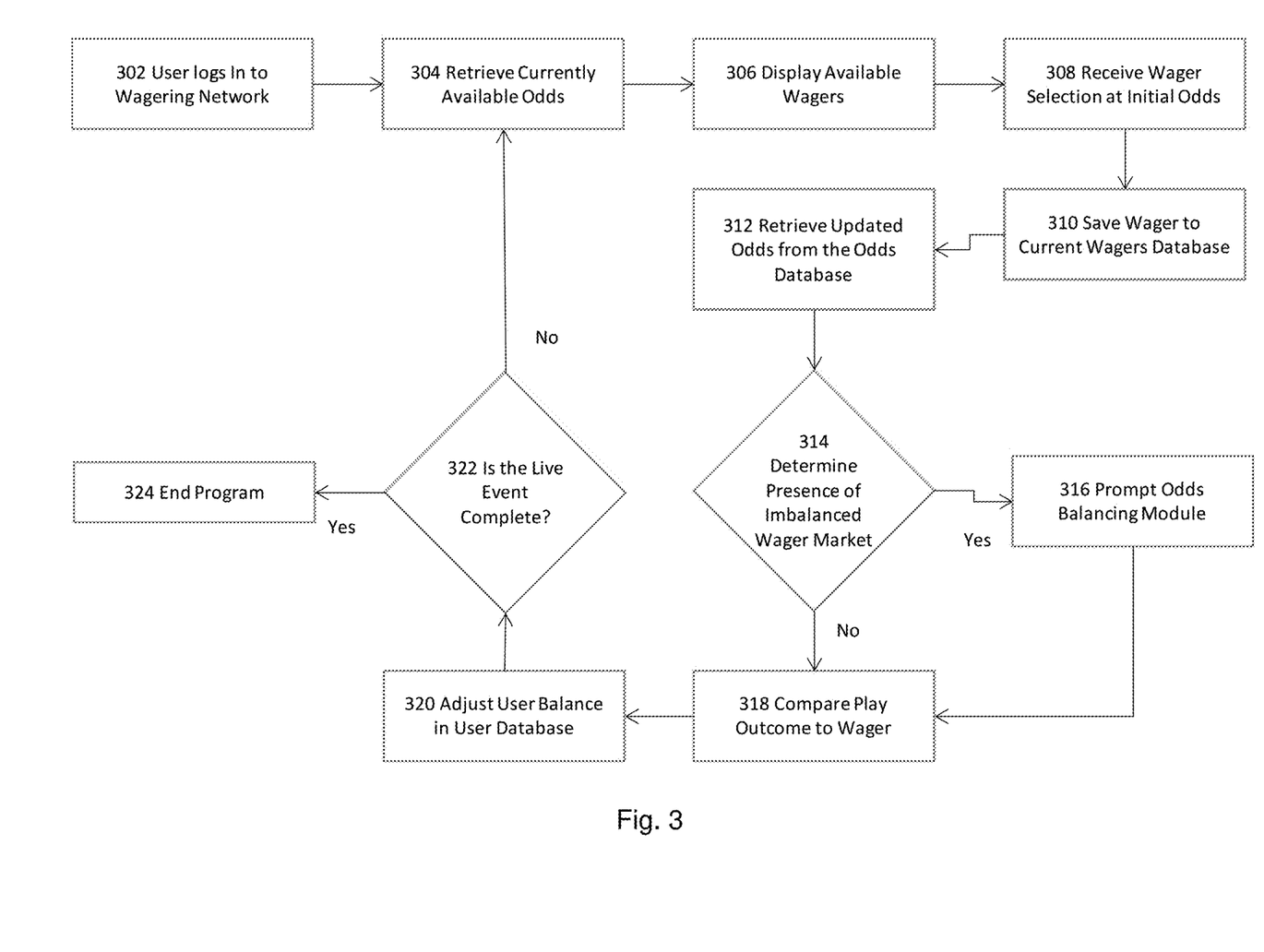
FIG. 3 illustrates a base wagering module, according to an embodiment.

FIG. 3 illustrates the base wagering module 120. The process begins with a user logging into the wagering network 108 at step 302 via a user interface by entering a username and a password. In an embodiment the username is an email address and the password is a combination of alphanumeric characters. At step 304 the base wagering module 120 retrieves the current odds for available wagers from the odds database 116. At step 306 the base wagering module 120 Displays available wagers to a user via a mobile device 124. The available wagers may include a win condition, such as the offensive team in a football game completing a pass for a first down, and odds, such as 5/1 and can be selected by a user. At step 308 the base wagering module 120 receives a wager at from a user via the wagering app 126 on the mobile device 124. The wager may include a wager amount such as $50, a win condition, upon which a payout is made according to the odds, and odds, such as 5/1, in which case the user will receive a payout of five times their wager if the win condition is met during the play. At step 310 the base wagering module 120 saves the wager to the current wagers database 118. At step 312 the base wagering module 120 retrieves updated odds for available wagers from the odds database 116. The updated odds may be different than the initial odds. In an embodiment, the initial odds being 1/5 that the next play during an American football team will result in pass for a first down and the updated odds being 1/6 that the same result would occur. At step 314 the base wagering module 120 determines the presence of an imbalanced wager market. A wager market provides an option to place wagers on the outcome of a play during a live event 102. A wager market is imbalanced when the wagering network's 108 exposure of one outcome exceeds a threshold. In an embodiment, a wager market offering the options to wager that the next play during an American football game will result in a first down at odds of 5/1 or a first down will not occur at odds of 2/1. Wagers totaling $200 are placed on the next play resulting in a first down and wagers totaling $5000 are placed on the next play not resulting in a first down, and the resulting total payout is $1000 if a first down occurs and $10,000 if a first down does not occur resulting in an exposure to the wagering network 108 of $9000 if the outcome is not a first down which can alternatively be represented by a ratio of 10 to 1. The ratio of 10 to 1 exceeds a threshold of 5 to 1 as defined by an administrator of the wagering network 108 and indicates an imbalanced wager market. The threshold may alternatively be determined algorithmically or may be an absolute value representing the exposure instead of relative. In further embodiments, a wagering market may have more than two possible outcomes. At step 316 the base wagering module prompts the odds balancing module 122 when the presence of an imbalanced wager market has been determined. The odds balancing module 122 queries the current wagers database 118 for current wagers and calculates the wagering network's 108 exposure for each outcome. Further, the base wagering module 120 identifies the greatest exposure to the wagering network 108. The base wagering module identifies a user who wagered on the outcome with the lowest exposure and retrieving updated odds from the odds database 116. If the updated odds are different than the odds when the user placed the wager, the base wagering module 120 displays an offer to the user to increase their wager such that the total wager, including the original wager amount, will be wagered at the updated odds. The odds balancing module 122 further determines whether an imbalance still exists and returns to the base wagering module 120 when an imbalance no longer exists. At step 318 the base wagering module 120 compares the results of the play outcome to the outcome wagered upon by polling the sensors 104. In an embodiment, the wager win condition may be an American football team completing a pass for a first down and the actual result may be an American football team running for a gain of three yards. The base wagering module 120 further determines that the wager was won if the play outcome and the outcome wagered upon are the same. Alternatively, the base wagering module 120 determines that the wager was lost if the play outcome and the outcome wagered upon are different. At step 320 the base wagering module 120 adjusts the account balance of the user in the user database 110 based on the result of the wager. If the wager is won, then the base wagering module 120 increases the account balance in an amount equal to the payout. The payout is determined based upon the odds accepted when the user placed the wager. In an embodiment, the odds are 5/1 and the wager amount is $50, so the payout would be $250. If the wager amount was not debited from the account balance prior to play completion, then adjust the account balance by the difference between the wager amount and the payout. Similarly, if the wager was lost and the wager amount was not previously debited from the account balance, reduce the account balance by the wager amount. At step 322 the base wagering module polls the sensors 104 for whether the live event 102 is complete. If the live event is not complete, the base wagering module 120 returns to step 304. The base wagering module 120 ends the program at step 324 if the live event 102 is complete.

Figure 4:
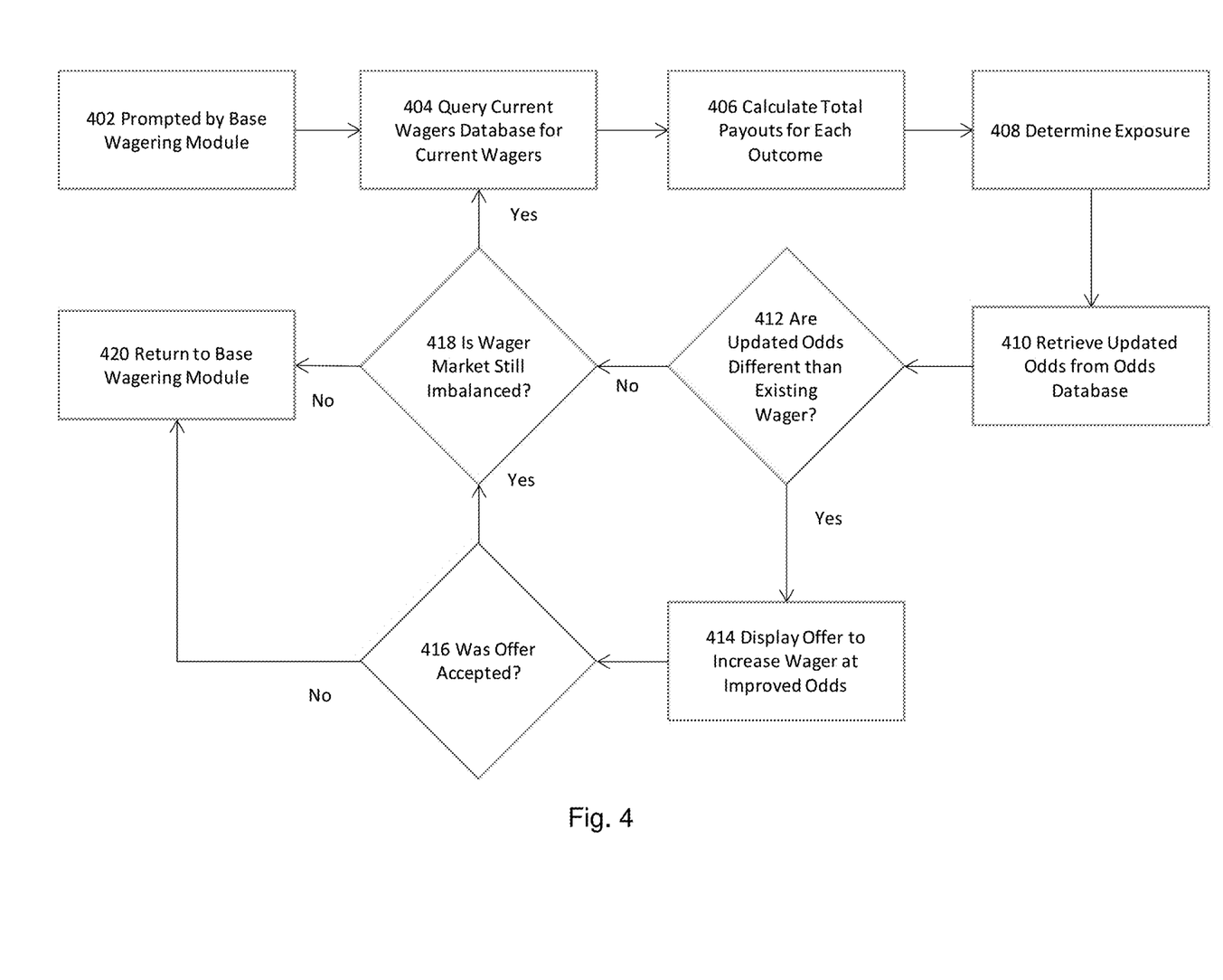
FIG. 4 illustrates a odds balancing module, according to an embodiment.

FIG. 4 illustrates the odds balancing module 122. The process begins with receiving a prompt at step 402 from the base wagering module 120 that a wager market is imbalanced. The wager market is imbalanced when the exposure of an outcome exceeds a threshold. At step 404 the odds balancing module 122 queries the current wagers database 118 for all wagers placed on a play during a live sporting event 102. The wagers include a wager amount, odds and an outcome or win condition. In an embodiment, the play is the next play in an American football game and the outcomes or possible win conditions include a first down occurring or a first down not occurring. Additional outcomes may include the success of the play action such as a completed pass for a first down or alternatively an interception by the opposing team. Further outcomes may include a field goal attempt and whether it was successful or a touchdown. At step 406 the odds balancing module 122 calculates the total payouts for each outcome by first multiplying each wager amount by the corresponding odds to calculate a single payout, and further summing all payouts with a matching outcome or win condition. In an embodiment, an outcome is a run for a first down and the outcome has three wagers placed on that outcome as the win condition in amounts of $50, $100 and $200, each at odds of 2/1. The resulting payouts would be $100, $200 and $400 respectively resulting in total payouts of $700 for the outcome of a run for a first down. Further the odds balancing module 122 calculates the total payouts for each additional outcome which received at least one wager. At step 408 the odds balancing module 122 determines the wagering network's 108 largest exposure from a wager market. The largest exposure is the difference between the largest total payouts and the total payouts of all other outcomes. An exposure may be represented as an absolute amount or a ratio representing the relative exposure from one outcome to all other outcomes. In an embodiment, a wager market including two possible outcomes, that a first down will occur on the next play of an American football game or a first down will not occur. The wager network 108 receiving $200 in wagers at odds of 5/1 that a first down will occur with a total potential payout of $1000 and $5000 in wagers at odds of 2/1 that a first down will not occur with a total potential payout of $10,000. The exposure equal to $10,000 minus $1000 or $9000 or alternatively being represented as 10 to 1 as the exposure represents ten times the losses for the wagering network 108 compared to the alternative outcomes. At step 410 the odds balancing module 122 retrieves updated odds by querying the odds database 116 for the current odds for the outcome with the least total payouts. At step 412 the odds balancing module 122 compares the updated odds to the current wager of a user from the current wagers database 118. In an embodiment the updated odds being 5/1 and a user Joe Smith having placed a current wager of $100 at 3/1 odds and determining that the updated odds are different than the user's current wager. At step 414 the odds balancing module 122 displays an offer to a user to increase their current wager amount at improved odds such that the improved odds would yield a higher payout than the odds at which the current wager was placed. The offer further provides an opportunity for the user to change the odds of the current wager to the improved odds if the user accepts the offer to increase the wager amount. In an embodiment, user Joe Smith has a current wager of $100 at 3/1 odds that the outcome of the next play in an American football play is that the quarterback will be sacked and is offered to increase his wager by $50 to a total wager amount of $150 at 5/1 odds. At step 416 the odds balancing module 122 checks whether the offer was accepted by the user. If the offer was accepted, the odds balancing module 122 proceeds to step 418, and if the offer was not accepted, returns to the base wagering module 120. At step 418 the odds balancing module 122 checks whether the wager market is still imbalanced by determining the wagering network's exposure and comparing the exposure to a threshold. In an embodiment, a user Joe Smith places an initial wager for $50 at 5/1 odds that the next play of an American football team will result in a first down and upon being offered improved odds of 6/1, increases the initial wager from $50 to $100, thus replacing the initial wager of $50 at 5/1 odds which would have had a potential payout of $250 with a new wager of $100 at 6/1 odds which would have a potential payout of $600 increasing the total payouts for a first down occurring by the difference, or $350. If the original amount of wagers placed on a first down occurring was $200 at odds of 5/1, the original total payout would have been $1000. Increased by the $350 as a result of the increased wager by user Joe Smith, the new total payout for a first down occurring is $1350. If the amount of wagers placed on a first down not occurring does not change from an original amount of $5000 at odds of 2/1, the total payout would remain the same and the new exposure would be $8650 or 10 to 1.35. If the exposure threshold set by an administrator of the wagering network 108 is set at 5 to 1, the exposure of 10 to 1.35 still exceeds the threshold and the wager market is still imbalanced. In an alternate embodiment, the new exposure does not exceed the threshold and the wager market is no longer imbalanced. At step 420 the odds balancing module 122 returns to the base wagering module 120.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method of reducing exposure of a wagering network by incentivizing targeted users, comprising:
receiving, by the wagering network, data describing a live sporting event upon which wagers can be placed on single plays inside of the live event, the data having been transmitted from at least one of a plurality of sensors evaluating the live event and a data feed external to the wagering network which evaluates the live event;
measuring, by the computer processor of the wagering network, a balance of wagers stored in a wagers database of the wagering network on each potential outcome of a next play;
identifying, by the computer processor of the wagering network, instances in which the balance of wagers raises exposure of the wagering network above a predetermined threshold;
updating, by the computer processor of the wagering network, odds of each possible outcome of the next play under which the wagers may be placed;
identifying, based on wagers stored in the wagers database, users who have already placed a wager opposite the exposure;
transmitting, from the wagering network to a mobile device of each of the identified users, an offer comprising one or more incentives to the identified users to increase a wager amount; and
polling, by the computer processor of the wagering network, at least one of the plurality of sensors and the data feed external to the wagering network for an outcome of the next play, wherein the plurality of sensors comprises at least one of a motion sensor, a temperature sensor, a humidity sensor, a camera, a microphone, a radio receiver, a LIDAR device, a tracking device, and an ultrasound device and is located at the live sporting event and observing the live event directly;
and wherein the tracking device comprises at least one of an RFID tag and a GPS chip which is embeddable in at least one of a player uniform, in field equipment in a field of play, in a boundary of the field of play, or in a marker of the field of play.

2. The method of reducing exposure of a wagering network by incentivizing targeted users of claim 1, further comprising querying one or more wagers in the wagers database to identify the instances in which the balance of wagers raises the exposure of the wagering network above the predetermined threshold.

3. The method of reducing exposure of a wagering network by incentivizing targeted users of claim 1, wherein the one or more incentives are updated odds on the already placed wager.

4. The method of reducing exposure of a wagering network by incentivizing targeted users of claim 1, further comprising determining the wagers on each potential outcome of the single play are balanced after the offering of the one or more incentives.

5. The method of reducing exposure of a wagering network by incentivizing targeted users of claim 1, further comprising determining a maximum exposure of the wagering network.

6. The method of reducing exposure of a wagering network by incentivizing targeted users of claim 1, further comprising:
transmitting, from the mobile device of those identified users which accept the offer, an updated wager to the wagering network,
updating the wagers database with the updated wager, and
determining if exposure of the wagering networks still exceeds the predetermined threshold.

7. A method for providing updated wagering options on a wagering network for single play wagering, comprising executing on a processor the steps of:
displaying a wagering platform which is connected to the wagering network on a mobile device of a user;
displaying one or more wagers for wagering on a single play of a live sporting event which are stored in a wagers database of the wagering network; displaying a selected wager having a starting odds;
receiving, by the mobile device and from the wagering network, an offer comprising at least improved odds over the starting odds for the selected wager from the wagering network in response to a determination that exposure of the wagering network for the selected wager exceeds a predetermined threshold, and
displaying the offer to the user of the mobile device after the wager is selected on the wagering platform,
wherein the wagering network receives data describing the live sporting event, the data having been transmitted from at least one of a plurality of sensors evaluating the live event and a data feed external to the wagering network which evaluates the live event,
wherein exposure of the wagering network for the selected wager is determined based upon wagers stored in a wagers database of the wagering network for each potential outcome of the selected play,
wherein the wagering network determines a result of the selected play by polling at least one of the plurality of sensors and the data feed external to the wagering network, and
wherein the plurality of sensors comprises at least one of a motion sensor, a temperature sensor, a humidity sensor, a camera, a microphone, a radio receiver, a LIDAR device, a tracking device, and an ultrasound device and is located at the live sporting event and observing the live event directly;
and wherein the tracking device comprises at least one of an RFID tag and a GPS chip which is embeddable in at least one of a player uniform, in field equipment in a field of play, in a boundary of the field of play, or in a marker of the field of play.

8. The method for providing updated wagering options on a wagering network for single play wagering of claim 7, wherein the wagering network transmits to the mobile device the offer in response to a determination by the wagering network that exposure of the wagering network with respect to a wager already placed by the user exceeds a predetermined threshold, and
wherein the wagering platform displays the offer to the user to incentivize the user to update the wager already placed.

9. A method of reducing exposure of a wagering network by incentivizing targeted users, comprising:

receiving, by a computer processor of the wagering network, data describing a live sporting event upon which wagers can be placed inside of the live event, the data having been transmitted from at least a data feed external to the wagering network which evaluates the live event;

measuring, by the computer processor of the wagering network, a balance of wagers stored in a wagers database of the wagering network on each potential action of a next play in the live event;

identifying by the computer processor of the wagering network, instances in which the balance of wagers raises exposure of the wagering network above a predetermined threshold;

updating, by the computer processor of the wagering network, odds of each possible outcome of the next play under which the wagers may be placed;

identifying, based on wagers stored in the wagers database, users who have already placed a wager opposite the exposure;

transmitting, from the wagering network to a mobile device of each of the identified users, an offer comprising one or more incentives to the identified users to increase a wager amount; and polling, by the computer processor of the wagering network, the data feed external to the wagering network for an outcome of the next play;

and wherein the tracking device comprises at least one of an RFID tag and a GPS chip which is embeddable in at least one of a player uniform in field equipment in a field of play, in a boundary of the field of play, or in a marker of the field of play.

10. A method of reducing exposure of a wagering network by incentivizing targeted users, comprising:

receiving, by a non-human automation of the wagering network, data describing a live sporting event upon which wagers can be placed on single plays inside of the live event, the data having been transmitted from at least one of a plurality of sensors evaluating the live event and a data feed external to the wagering network which evaluates the live event;

measuring, by the non-human automation of the wagering network, a balance of wagers stored in a wagers database of the wagering network on each potential outcome of a next play;

identifying, by the non-human automation of the wagering network, instances in which the balance of wagers raises exposure of the wagering network above a predetermined threshold;

updating, by the non-human automation of the wagering network, odds of each possible outcome of the next play under which the wagers may be placed;

identifying, based on wagers stored in the wagers database, users who have already placed a wager opposite the exposure;

transmitting, from the wagering network to a mobile device of each of the identified users, an offer comprising one or more incentives to the identified users to increase a wager amount; and polling, by the non-human automation of the wagering network, at least one of the plurality of sensors and the data feed external to the wagering network for an outcome of the next play, wherein the plurality of sensors comprises at least one of a motion sensor, a temperature sensor, a humidity sensor, a camera, a microphone, a radio receiver, a LIDAR device, a tracking device, and an ultrasound device and is located at the live sporting event and observing the live event directly; and wherein the tracking device comprises at least one of an RFID tag and a GPS chip which is embeddable in at least one of a player uniform, in field equipment, in a field of play, in a boundary of the field of play, or in a marker of the field of play.

* * * * *

UNITED STATES PATENT AND TRADEMARK OFFICE
CERTIFICATE OF CORRECTION

| | |
|---|---|
| PATENT NO. | : 11,217,067 B1 |
| APPLICATION NO. | : 17/096187 |
| DATED | : January 4, 2022 |
| INVENTOR(S) | : Casey Alexander Huke et al. |

It is certified that error appears in the above-identified patent and that said Letters Patent is hereby corrected as shown below:

In the Claims

At Column 17, Line 28, "the" should read --a--.

Signed and Sealed this
Third Day of September, 2024

Katherine Kelly Vidal
*Director of the United States Patent and Trademark Office*